US010042082B2

(12) United States Patent
Luo et al.

(10) Patent No.: US 10,042,082 B2
(45) Date of Patent: Aug. 7, 2018

(54) GAMMA RAY MEASUREMENT APPARATUS, SYSTEMS, AND METHODS

(71) Applicant: Halliburton Energy Services, Inc., Houston, TX (US)

(72) Inventors: Da Luo, Houston, TX (US); Weijun Guo, Houston, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 0 days.

(21) Appl. No.: 15/023,211

(22) PCT Filed: Dec. 4, 2014

(86) PCT No.: PCT/US2014/068570
§ 371 (c)(1),
(2) Date: Mar. 18, 2016

(87) PCT Pub. No.: WO2016/089407
PCT Pub. Date: Jun. 9, 2016

(65) Prior Publication Data
US 2016/0299251 A1    Oct. 13, 2016

(51) Int. Cl.
*G01V 5/06* (2006.01)
*G01T 1/40* (2006.01)
*E21B 49/00* (2006.01)
*G01T 1/20* (2006.01)

(52) U.S. Cl.
CPC ........... *G01V 5/06* (2013.01); *E21B 49/00* (2013.01); *G01T 1/40* (2013.01); *G01T 1/2018* (2013.01)

(58) Field of Classification Search
CPC ............ G01V 5/06; G01V 5/101; E21B 49/00
See application file for complete search history.

(56) References Cited

U.S. PATENT DOCUMENTS

| 3,976,878 | A | * | 8/1976 | Chevalier | ................ | G01V 5/06 |
| | | | | | | 250/253 |
| 4,053,767 | A | | 10/1977 | Kampfer et al. | | |
| 4,436,996 | A | | 3/1984 | Arnold et al. | | |
| 4,580,048 | A | | 4/1986 | Dion | | |
| 4,585,939 | A | | 4/1986 | Arnold et al. | | |
| 5,360,975 | A | | 11/1994 | Stoller | | |

(Continued)

OTHER PUBLICATIONS

"International Application Serial No. PCT/US2014/068570, International Search Report dated Aug. 18, 2015", 3 pgs.

(Continued)

*Primary Examiner* — Marcus Taningco
(74) *Attorney, Agent, or Firm* — Haynes and Boone, LLP

(57) ABSTRACT

In some embodiments, an apparatus and a system, as well as a method and article, may operate to detect gamma radiation as detected gamma radiation, and to determine a relative level of potassium decay energy within a selected band of energy levels, with respect to a combination of at least two of potassium, uranium, or thorium. Further operations may include adjusting at least one of a detector supply voltage or an analyzer gain to place the potassium decay energy at a selected energy level location when the relative level of potassium decay energy exceeds a predetermined threshold, the threshold based on an energy level of a combination of detected gamma radiation within the selected band of energy levels. Additional apparatus, systems, and methods are disclosed.

20 Claims, 6 Drawing Sheets

(56) References Cited

U.S. PATENT DOCUMENTS

| | | |
|---|---|---|
| 5,600,135 A | 2/1997 | Jacobson |
| 2005/0127282 A1* | 6/2005 | Grau .................... G01V 5/101 |
| | | 250/262 |
| 2005/0199794 A1 | 9/2005 | Mickael |
| 2014/0100785 A1 | 4/2014 | Sloan |
| 2016/0146948 A1* | 5/2016 | Hovgaard ................ G01T 1/17 |
| | | 250/362 |

OTHER PUBLICATIONS

"International Application Serial No. PCT/US2014/068570, Written Opinion dated Aug. 18, 2015", 12 pgs.

* cited by examiner

US 10,042,082 B2

GAMMA RAY MEASUREMENT APPARATUS, SYSTEMS, AND METHODS

PRIORITY APPLICATIONS

This application is a U.S. National Stage Filing under 35 U.S.C. 371 from International Application No. PCT/US2014/068570, filed on 4 Dec. 2014, which application is incorporated herein by reference in its entirety.

BACKGROUND

Understanding the structure and properties of geological formations can reduce the cost of drilling wells for oil and gas exploration. Measurements made in a borehole (i.e., downhole measurements) are typically performed to attain this understanding, to identify the composition and distribution of material that surrounds the measurement device downhole. To obtain such measurements, gamma ray detectors are often used to measure naturally-occurring gamma radiation downhole. However, the output of some gamma ray detectors may fluctuate due to environmental conditions downhole. These fluctuations can cause changes in the apparent energy level detected by the gamma ray detector, leading to inaccuracies in the measurements reported by the tool. Thus, compensation techniques have been developed.

One is to implant an artificial radioactive source in the detector and use its signature energy as a reference. Another is to compare the signals from two detectors. However the first suffers from transportation restrictions, and is also limited by the computing power available downhole, or the available telemetry bandwidth, due to extensive calculations that implement whole spectrum curve fitting. The second increases the expense of the tool.

DETAILED DESCRIPTION

To address some of the challenges described above, as well as others, apparatus, systems, and methods are described herein for stabilizing the gain of gamma ray detectors. For example, a method is disclosed herein to stabilize the spectrum during natural gamma ray logging, when the potassium contribution to the spectrum is significant. The method provides a simplified and way to speed up the process of gain stabilization, without using an embedded radiation source in the tool, and without the extensive calculations that are associated with whole-spectrum curve fitting. In addition, better utilization of the pulse height analyzer energy scale can increase the precision of the spectrum results.

The details of various embodiments will now be described.

Figure 1:
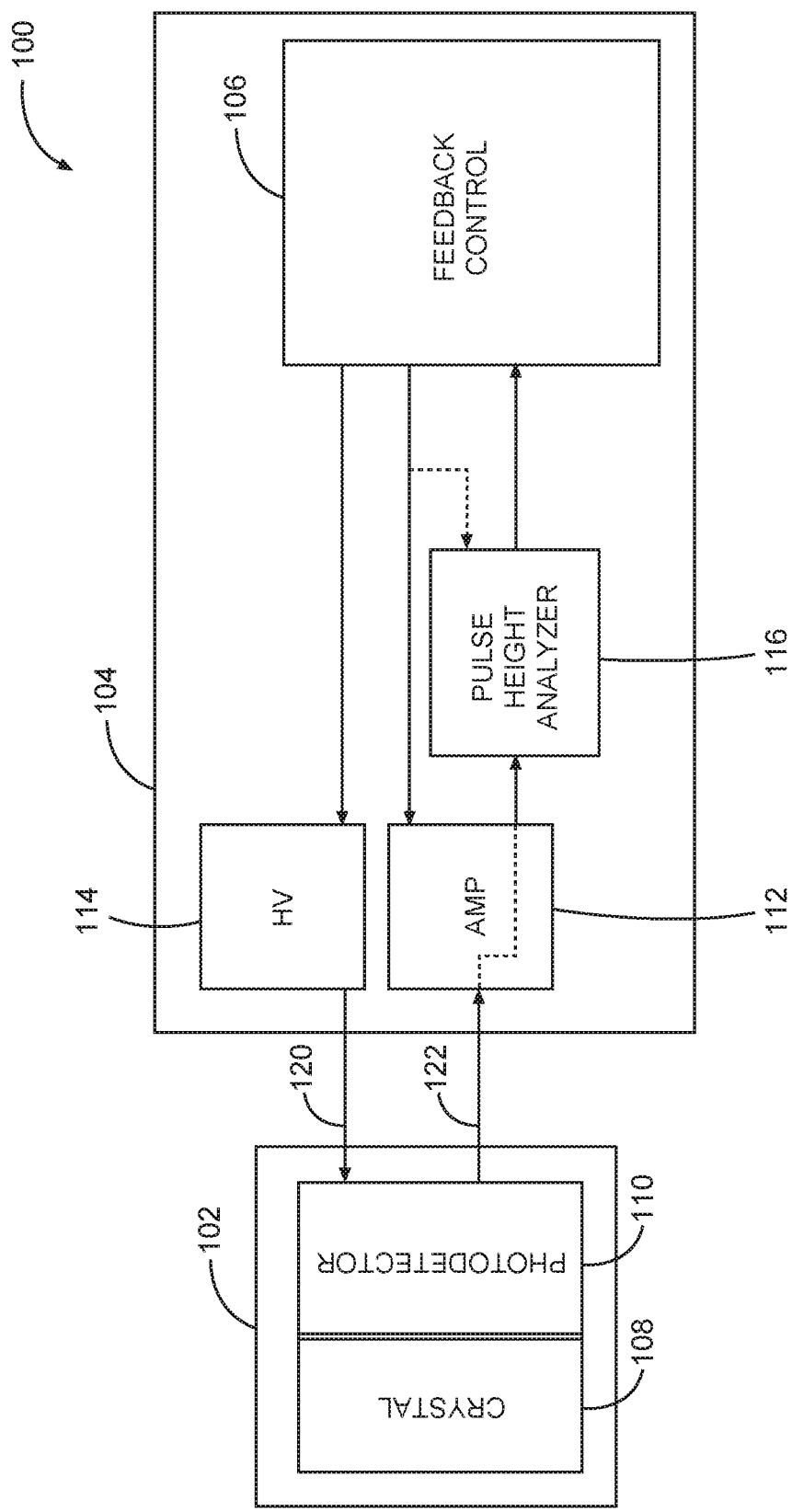
FIG. 1 is a block diagram of a gamma ray measurement apparatus in accordance with various embodiments of the invention.

FIG. 1 is a block diagram of a gamma ray measurement apparatus 100 in accordance with various embodiments of the invention. The gamma ray measurement apparatus 100 includes a downhole gamma ray detector 102 and a signal processor 104, which in turn may comprise a feedback control 106. In some embodiments, the feedback control 106 is located outside of the signal processor 104.

The gamma ray detector 102 detects the natural gamma radiation. The gamma ray detector 102 can include a Scinturion gamma module, available from General Electric of Fairfield, Conn., for example, or other gamma ray detectors utilizing sodium-iodine (NaI)-based scintillation crystals, although many embodiments are not limited thereto. Natural gamma radiation is the result of radiation by a variety of elements, including potassium, uranium, and thorium—which are often present in subterranean formation environments. One of more parts of the apparatus 100, including the gamma ray detector 102, may be attached to a drilling assembly for logging while drilling (LWD) or measuring while drilling (MWD) operations. Similarly, one or more parts of the apparatus may be attached to a wireline tool for logging an existing well. Such embodiments are described later herein with reference to FIGS. 5 and 6. The gamma ray measurement apparatus 100 can include a plurality of gamma ray detectors, including a plurality of azimuthal gamma ray detectors.

Each gamma ray detector 102 operates to receive gamma ray energy emitted naturally by subsurface formations. Azimuthal gamma ray detectors may be located near the exterior of a logging tool and be spaced about a circumference of the tool. Thus, while a plurality of gamma ray detectors may be included in some of the apparatus 100 and systems described herein, only one is explicitly presented here for reasons of simplicity.

The gamma ray detector 102 provides signals that scale with the energy deposited by the gamma rays on the gamma ray detector 102. The gamma ray detector 102 may include one or more scintillation crystals 108 to scintillate responsive to radiation emitted by a subterranean formation environment. The gamma ray detector 102 may also comprise an optically-coupled photodetector 110, e.g., a photomultiplier tube, for transmitting light emitted by the scintillation crystals 108 within the detector 102. In most embodiments, the gamma ray detector 102 does not include a reference scintillation crystal.

The gamma ray detector 102 is electrically coupled to a signal processor 104. The signal processor 104 may include an amplifier 112, a variable high voltage supply unit 114, and pulse height analyzer 116. As noted previously the feedback control 106 may also be included in the signal processor 102.

The gamma ray detector receives a supply voltage from the high voltage supply unit 114. One high voltage supply unit 114 may be used to power multiple gamma ray detectors. The high voltage supply unit 114 may be configured so that the output voltage 120 (which serves as the supply voltage for the detector 102) can be adjusted by a feedback control 106.

For the purposes of this document, "high voltage" means a voltage that is greater than 300 V, whether alternating or direct current. The high voltage supply unit 114 may thus be capable of providing an output voltage in a range of about 500-5000 volts. The high voltage supply unit 114 can include an ORTEC® Model 456 or Model 556 high voltage power supply, available from AMETEK, Inc. of Berwyn, Pa., although embodiments are not limited thereto.

The signal processor 104 includes one or more amplifiers 112 to modify (e.g., amplify) the amplitude of signals 122, including electrical impulses provided by an output of the photodetector 110. The gain of the amplifier 112 can be adjusted by the feedback control 106. The signal processor 104 further includes the pulse height analyzer 116 to receive signals amplified by the amplifier 112 and representative of gamma ray measurements from the gamma ray detector 102. The pulse height analyzer 116 can generate one or more spectra based on the received gamma ray measurements, and the pulse height analyzer 116 can provide this multi-channel spectrum to the feedback control 106.

In some embodiments, the gain of the pulse height analyzer 116 is adjusted directly by the feedback control 106, when no amplifier 112 is present in the signal processor 104. The signal path in this instance is represented by the dashed lines that pass through the amplifier 112, and that come from the feedback control 106 to the pulse height analyzer 116. This arrangement may be used when the pulse height analyzer 116 has its own internal amplifier and/or gain adjustment.

The pulse height analyzer 116 may comprise circuitry similar to an ORTEC® EASY-NIM 928 combination MCB/quad counter/dual timer module, available from AMETEK, Inc, of Berwyn, Pa., although embodiments are not limited thereto. The gain stabilization device 106 controls the output voltage of the high voltage supply unit 114 and/or the gain of the pulse height analyzer 116 (either indirectly, via the output of the amplifier 112, or directly, as shown via the dashed lines in the figure) to effectively adjust the gain of the gamma ray detector 102.

In various embodiments, whether employed on a wireline (FIG. 6) or as part of logging while drilling operations (FIG. 7), the feedback control 106 receives the multi-channel spectrum from the pulse height analyzer 116 and records the spectrum across n channels (where n equals the number of channels). Each channel represents a range of energy levels, wherein the energy levels can be measured in units, such as kilo-electron volts (keV). The number of channels n may vary for different applications; for example, n may be 10, 16, 20, 50, 64, 100, 128, 150, 200, 256, 400 or more, or any number in between. In some embodiments, the range of channel numbers corresponds to energy values of 0 keV to 2000 keV, although embodiments are not limited thereto. The range of individual channel numbers may be set based on criteria such as electrical parameters of the gamma ray detector 102. The pulse height analyzer determine the number of "counts" over its range of channels, where the count for a particular channel refers to the number of times gamma ray energy with the corresponding energy level is detected by the gamma ray detector 102.

The gamma ray measurement apparatus 100 can be a gross counting gamma ray detector, wherein the process of determining the gross count involves developing counts over a plurality of channels arranged in a spectrum. The gain of the gamma ray detector 102 varies at times with certain variables, e.g., temperature, equipment limitations, high voltage of the photodetector 110 in the gamma ray detector 102, etc. These variations will affect the counts stored in the various channels, leading to inaccurate measurement reports being reported by the gamma ray measurement apparatus 100. To obtain a gross count that is not affected by these variations, the feedback control 106 stabilizes the gain of the gamma ray detector 102 by determining the channel number for the pulse height analyzer 116 that is associated with counts for Potassium, and then adjusting the output of the high voltage supply unit 114 and/or the gain of the pulse height analyzer 116, to shift the location of the counts associated with Potassium from the channel number indicated by the analyzer 116, to a desired location/channel number.

Figure 2:
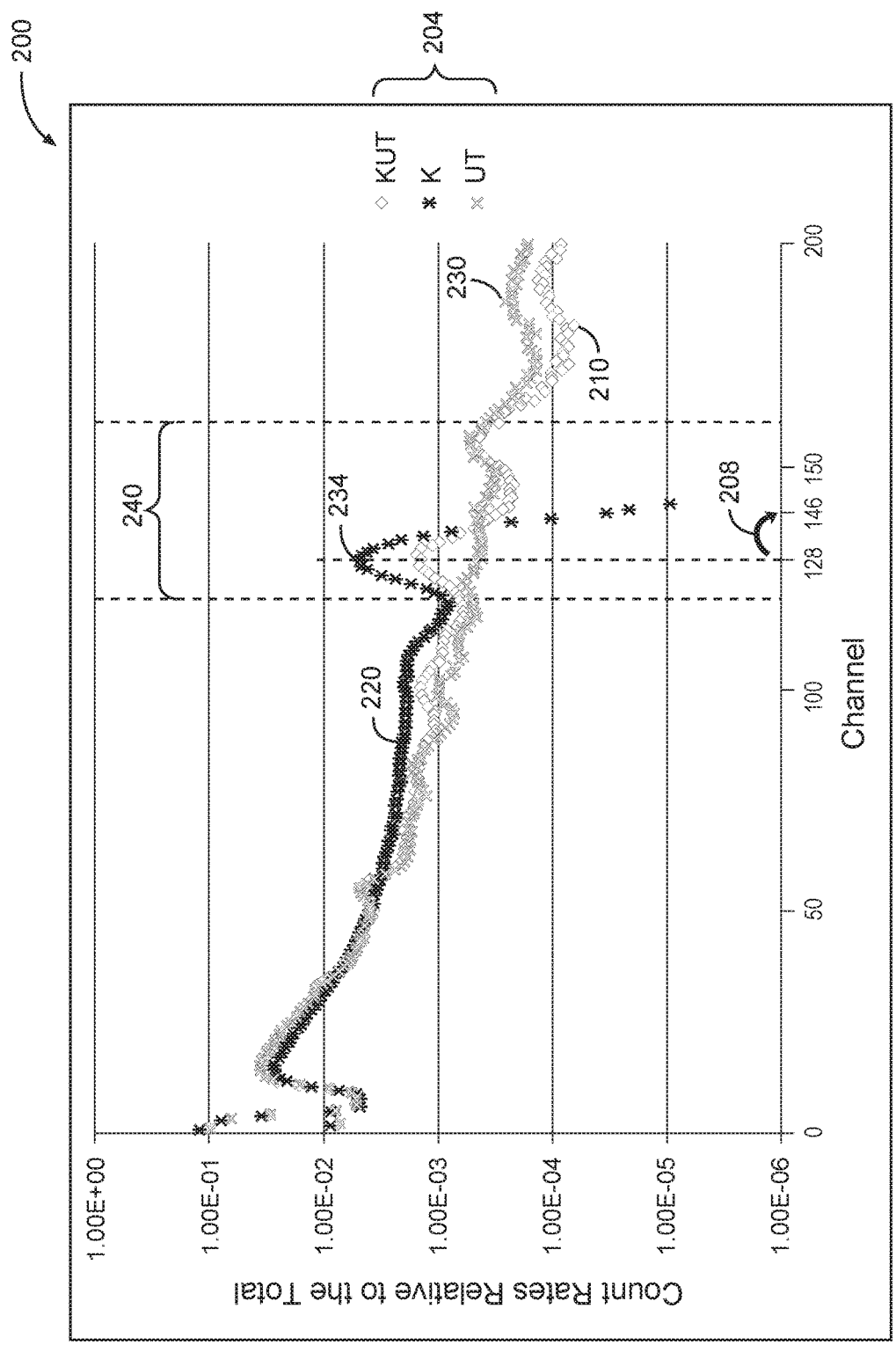
FIG. 2 depicts example gamma spectra in three different formation environments with channel shifting indicated in accordance with various embodiments of the invention.

FIG. 2 depicts example gamma spectra 200 in three different formation environments 204 with channel shifting 208 indicated in accordance with various embodiments of the invention. The spectrum 220 is an example spectrum for a formation environment consisting essentially of potassium. As will be understood by those of ordinary skill in the art, this type of formation environment is useful as a reference, but may not occur commonly in the field. However most, if not all, formation environments will include at least some potassium due to the presence of high-potassium drilling fluids that have been placed downhole in drilling and exploration operations.

A potassium spectrum such as spectrum 220 may be generated as a reference prior to operation in the field, which allows representative count values to be known beforehand (e.g., using samples taken from downhole), to act as a limiting spectrum beyond which naturally occurring gamma radiation will typically not be observed.

The spectra 200 are examples of what can be generated by a pulse height analyzer based on values provided by a gamma ray detector in accordance with some embodiments. In FIG. 2, each channel in the x-axis represents a unit measurement of energy, for example 12 keV, and the count rates (relative to the total spectrum) are measured for each channel are plotted on the y-axis.

In some embodiments, the feedback control 106 will operate within a range 240 of channels. This range 240 can be established using reference measurements, as noted previously, to span whatever range of drift is expected in the measurement of Potassium radiation.

To obtain the spectra 200, a gamma detector which detects natural gamma ray radiation was used. The detector included a scintillation crystal type device, integrated with a photomultiplier. The detector was exposed to a variety of radiation, such as a combination 210 of Potassium, Uranium, and Thorium (KUT); Potassium 220 (K); and a combination 230 of Uranium and Thorium (UT).

A pulse height analyzer was used to receive signals from the detector. The analyzer provided, as output, a multi-channel spectrum according to the pulse height of the received signals. In this case, the spectra for KUT, K, and UT are shown.

During operation of the apparatus 100, an initial comparison of the count rates for each channel relative to the total count rates of the full spectrum is made. For a 200-channel system as shown in the figure, the counts of individual channels within a range of channels 240 are compared with the sum of counts for the total spectrum, since the energy level associated with Potassium decay (i.e., 1460 keV) drifts over some span that falls within the range 240 of channels. In this case, the range of energies monitored by channels 120 to 160 is expected to cover the maximum amount of drift that will be experienced during operations downhole. Then, if the count rates of one or more channels within the range 240 are larger than $1/1000$ of the total count rates, it can be assumed that the spectrum as a whole is strongly affected by Potassium radiation.

As will be explained shortly, once the potassium contribution is confirmed, a specific channel (here, channel 128)

within the range 240 of channel numbers 120 to 160 that has a maximum count rate 234 is chosen to be associated with the potassium decay energy (i.e., 1460 kev).

At this point, the high voltage power supply unit output and/or the pulse height analyzer gain can be adjusted to shift the energy monitored by channel 128 to any desired channel. If this process of measurement, comparison, and adjustment occur on a periodic basis, so that the detected Potassium radiation count is consistently shifted to a fixed channel number (e.g., channel 146, corresponding to 1460 keV in this case) the spectrum gain for the detector will be relatively stable.

If it turns out that the Potassium contribution to the spectrum 220 is not significant (e.g., there is no peak for detected Potassium radiation within the range 240), then other methods can be used to stabilize the gain. Thus, many embodiments may be realized.

For example, referring now to FIGS. 1-2, in some embodiments, an apparatus 100 may comprise a gamma radiation detector 102, a pulse height analyzer 116, and feedback control 106. Feedback from the pulse height analyzer 116 may be used to adjust the input voltage level of the radiation detector 102, and/or the gain of the pulse height analyzer 116. As noted previously, gamma radiation detectors including NaI and other scintillation crystals are available from the General Electric Company of Fairfield, Conn.

In some embodiments, an apparatus 100 comprises a gamma radiation detector 102 to receive a detector supply voltage, the gamma radiation detector 102 being used to detect gamma radiation. The apparatus 100 may also include a pulse height analyzer 116 coupled to the gamma radiation detector 102, the pulse height analyzer 116 being used to determine a relative level of potassium decay energy within a selected band of energy levels (e.g., the range 240), with respect to a combination of at least two of potassium, uranium, or thorium (e.g., KUT, or UT, etc.).

The apparatus 100 may further include a feedback control 106 to adjust at least one of the detector supply voltage (e.g., the output voltage of the supply 114) or the analyzer gain of the pulse height analyzer 116 to place the potassium decay energy at a selected energy level location (e.g., channel 146 as shown in FIG. 2) when the relative level of potassium decay energy exceeds a predetermined threshold, the threshold based on an energy level of a combination of detected gamma radiation within the selected band of energy levels.

For example, in some embodiments, including those that make use of the detectors, power supply, and pulse height analyzer described above, the potassium contribution may be confirmed using a predetermined threshold that is $\frac{1}{1000}$ of the total count. Confirmation of the potassium contribution can be accomplished by first calculating the total count rate—over all channels (e.g., 200 in the given example). Second, a ratio of count rates is calculated for each individual channel. This is done by selecting a one channel at a time, and dividing its individual count rate by the previously-calculated total count rate. This "ratio of count rates" is determined for each channel in the range 240. If there is at least one channel having a ratio of count rates that turns out to be larger than $\frac{1}{1000}$, then the potassium contribution in the spectrum is confirmed.

Thus, in this particular case, the value of $\frac{1}{1000}$ is set as a threshold value for the ratio of count rates. This value serves as the threshold for a particular detector and electronics combination (e.g., a General Electric NaI scintillator or Hamamatsu ruggedized high temperature PMT, in combination with the high voltage supply and pulse height analyzer electronics described previously). If the crystal material in the detector is changed, or the sensitivity of other electronics in the chain are changed, the value of $\frac{1}{1000}$ may also change, as is well known to those of ordinary skill in the art.

For example, this threshold value might increase to $\frac{1}{500}$ when the detector-system response for the 1.4 keV energy gamma of potassium relative to the total gamma energy spectrum range is twice as sensitive as the detector-system that incorporates the components named above. This threshold value might decrease to $\frac{1}{2000}$ when the detector-system response for the 1.4 keV energy gamma of potassium relative to the total gamma energy spectrum range is half as sensitive as the detector-system that incorporates the components named above. In other words, the response of the detector and its processing electronics to the 1.4 keV energy gamma of potassium determines the actual value that is useful for a threshold value in many embodiments. The response to a selected energy level (e.g., 1.4 keV in this case) relative to the total gamma energy spectrum range is the strength of the signal generated by the system at the selected energy, relative to the total strength of signals generated across the full energy spectrum.

In some embodiments, the apparatus 100 may include a high voltage power supply 114 to supply the detector supply voltage.

The gain analyzer may operate to divide the energy spectrum into a number of bins, or channels. Thus, the analyzer gain may be associated with a pulse height analyzer 116 having an energy analysis spectrum comprising a number of channels into which energy is approximately equally divided (e.g., for a total spectrum that spans 2000 keV, each one of 200 channels may be allocated a span of 10 keV).

The selected band of energy levels may correspond to a set of channels on the pulse height analyzer 116. The location selected for the potassium decay energy (i.e., the channel location to which the potassium energy decay count is shifted) may lie within a selected band of channels on the pulse height analyzer 116. Thus, the selected energy level location may correspond to a single channel on the pulse height analyzer, where the single channel is included in the set of channels on the analyzer 116 (e.g., as shown in FIG. 2, the selected energy level location of channel 146 is included in the channel range 240. Still further embodiments may be realized.

Figure 3:
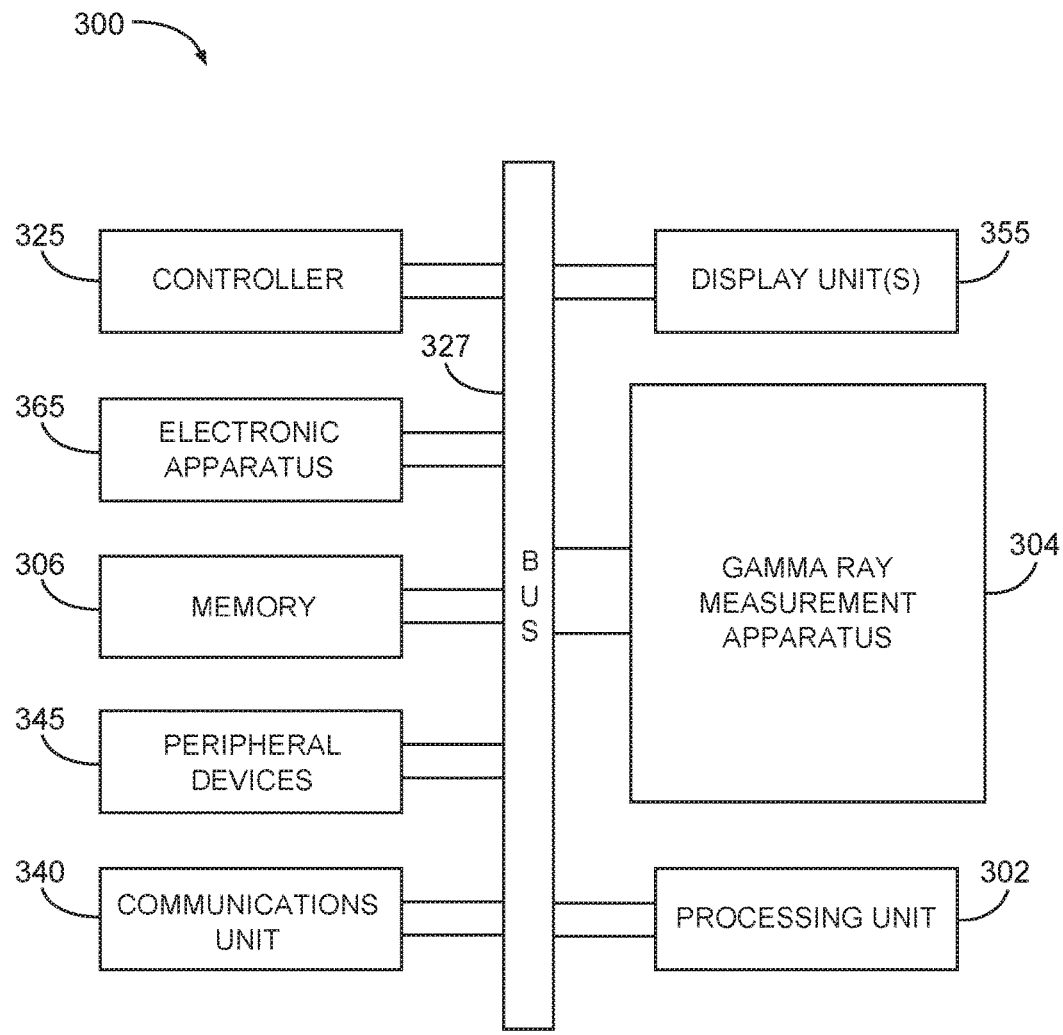
FIG. 3 is a block diagram of a logging system according to various embodiments of the invention.

For example, FIG. 3 is a block diagram of a logging system 300 according to various embodiments of the invention. Referring now to FIGS. 1 and 3, it can be seen that the logging system 300 can receive count measurements or other data from the gamma ray measurement apparatus 100 and provide gain stabilization for one or more gamma ray detectors 102 of the gamma ray measurement apparatus 100. The logging system 300 includes gamma ray measurement apparatus 304 operable in a wellbore. The gamma ray measurement apparatus 304 may be similar to or identical to the apparatus 100.

The processing unit 302 can perform functions that are executed by the feedback control 106 in addition to other control functions. The processing unit 302 can couple to the gamma ray measurement apparatus 304 to obtain measurements from the gamma ray measurement apparatus 304 as described earlier herein. In some embodiments, a logging system 300 comprises one or more of the gamma ray measurement apparatus 304, as well as a housing (not shown in FIG. 3; see FIGS. 5-6) that can house the gamma ray measurement apparatus 304 or other electronics. The housing might take the form of a wireline tool body, or a downhole tool as described in more detail below with reference to FIGS. 5 and 6. The processing unit 302 may be part of a surface workstation or attached to a downhole tool housing. In some embodiments, the processing unit 302 is packaged within the gamma ray measurement apparatus 304, as described earlier herein.

The logging system 300 can include a controller 325, other electronic apparatus 365, and a communications unit 340. The controller 325 and the processing unit 302 can be fabricated to operate the gamma ray measurement apparatus 304 to acquire measurement data, such as radiation energy counts.

Electronic apparatus 365 (e.g., electromagnetic sensors, etc.) can be used in conjunction with the controller 325 to perform tasks associated with taking measurements downhole with the gamma ray measurement apparatus 304. The communications unit 340 can include downhole communications in a drilling operation. Such downhole communications can include a telemetry system.

The logging system 300 can also include a bus 327 to provide common electrical signal paths between the components of the logging system 300. The bus 327 can include an address bus, a data bus, and a control bus, each independently configured. The bus 327 can also use common conductive lines for providing one or more of address, data, or control, the use of which can be regulated by the controller 325.

The bus 327 can include instrumentality for a communication network. The bus 327 can be configured such that the components of the logging system 300 are distributed. Such distribution can be arranged between downhole components such as the gamma ray measurement apparatus 304 and components that can be disposed on the surface of a well. Alternatively, several of these components can be co-located such as on one or more collars of a drill string or on a wireline structure.

In various embodiments, the logging system 300 includes peripheral devices that can include displays 355, additional storage memory, or other control devices that may operate in conjunction with the controller 325 or the processing unit 302. The display 355 can display diagnostic information for the gamma ray measurement apparatus 304 based on the signals generated according to embodiments described above. The display 355 can also be used to display one or more spectra 200, similar to what is illustrated in FIG. 2.

In an embodiment, the controller 325 can be fabricated to include one or more processors. The display 355 can be fabricated or programmed to operate with instructions stored in the processing unit 302 (for example in the memory 306) to implement a user interface to manage the operation of the gamma ray measurement apparatus 304 or components distributed within the logging system 300. This type of user interface can be operated in conjunction with the communications unit 340 and the bus 327. Various components of the logging system 300 can be integrated with the gamma ray measurement apparatus 304 or associated housing such that processing identical to or similar to the methods discussed with respect to various embodiments herein can be performed downhole.

In various embodiments, a non-transitory machine-readable storage device can comprise instructions stored thereon, which, when performed by a machine, cause the machine to become a customized, particular machine that performs operations comprising one or more features similar to or identical to those described with respect to the methods and techniques described herein. A machine-readable storage device, herein, is a physical device that stores information (e.g., instructions, data), which when stored, alters the physical structure of the device. Examples of machine-readable storage devices can include, but are not limited to, memory 306 in the form of read only memory (ROM), random access memory (RAM), a magnetic disk storage device, an optical storage device, a flash memory, and other electronic, magnetic, or optical memory devices, including combinations thereof.

The physical structure of stored instructions may be operated on by one or more processors such as, for example, the processing unit 302. Operating on these physical structures can cause the machine to perform operations according to methods described herein. The instructions can include instructions to cause the processing unit 302 to store associated data or other data in the memory 306. The memory 306 can store the results of measurements of formation parameters or parameters of the gamma ray measurement apparatus 100, to include gain parameters, calibration constants, identification data, etc. The memory 306 can store a log of the gamma radiation detected by the gamma ray detector 102. The memory 306 therefore may include a database, for example a relational database.

Figure 4:
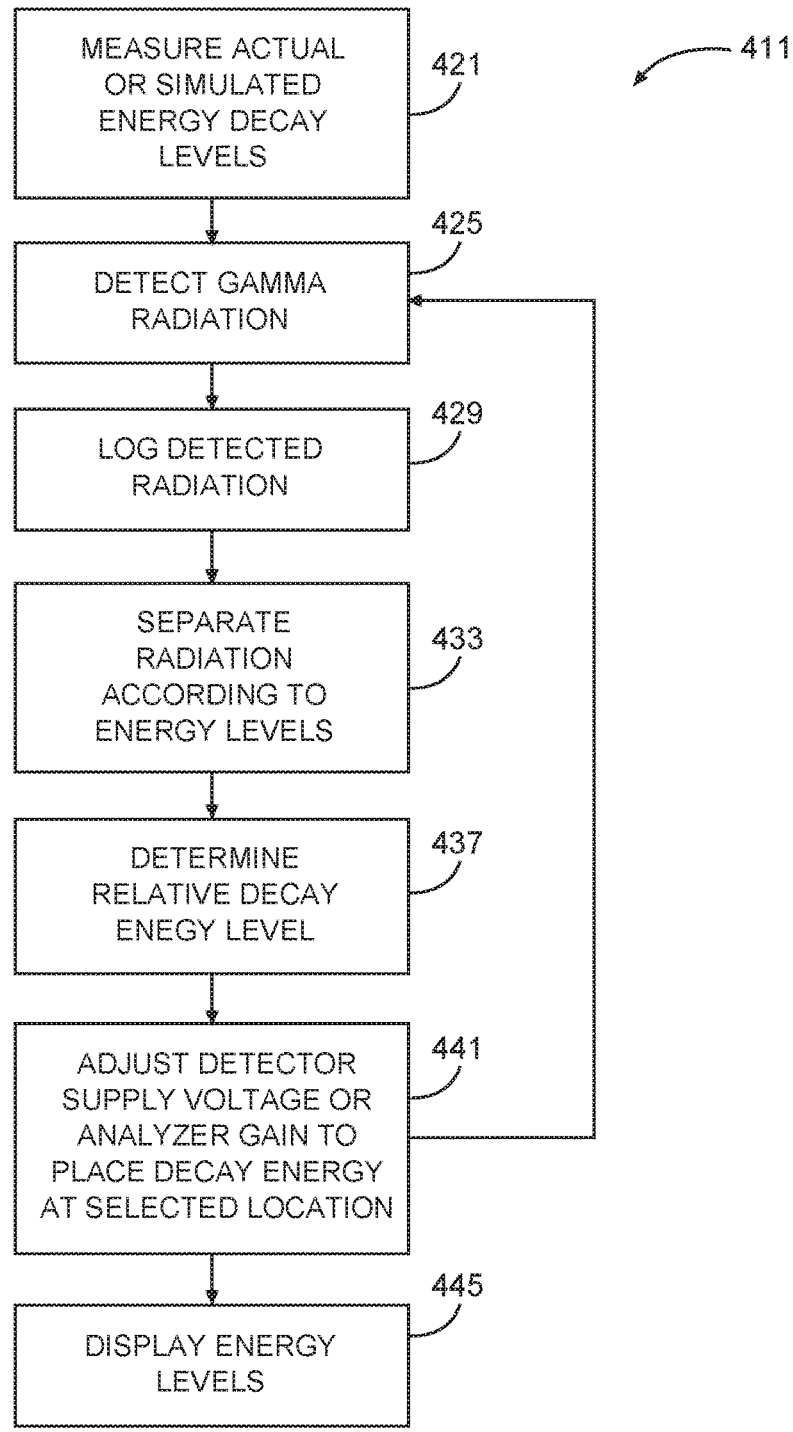
FIG. 4 is a flow diagram illustrating methods of stabilizing gamma ray measurement apparatus gain, according to various embodiments of the invention.

FIG. 4 is a flow diagram illustrating methods 411 of stabilizing gamma ray measurement apparatus gain, according to various embodiments of the invention. The methods 411 described herein are with reference to hardware circuitry, spectra, channel ranges, channel shifting, etc. shown in FIGS. 1-3. Some operations of the methods 411 can be performed in whole or in part by the feedback control 106 (FIG. 1), or any component of system 300 (FIG. 3) or gamma ray measurement apparatus 100 (FIG. 1), although many embodiments are not limited thereto.

In some embodiments, a method 411 comprises detecting gamma radiation at block 425, determining the relative level of potassium decay energy at block 437, and then, at block 441, adjusting the detector supply voltage and/or analyzer gain to locate the potassium decay energy at a specific place in the detected energy spectrum. Many variations may be realized.

For example, in some embodiments, simulation results can be used to determine the relative level of potassium decay energy. Thus, a method 411 may begin at block 421 with measuring actual or simulated energy decay levels of a combination of at least two of potassium, uranium, or thorium (e.g., UT, KUT, etc.), to determine the relative level of potassium (K) decay energy.

The method 411 may go on to block 425 to include detecting gamma radiation as detected gamma radiation.

In most embodiments, a single detector is used for stabilization and logging. Thus, the method 411 may include, at block 429, logging the detected gamma radiation as part of a downhole logging operation.

The detected gamma radiation can be separated, or binned, into a variety of energy levels. Thus, the method 411 may comprise separating the detected gamma radiation according to a preselected number of energy levels at block 433.

The method 411 may go on to block 437 to include determining a relative level of potassium decay energy within a selected band of energy levels, with respect to a combination of at least two of potassium, uranium, or thorium.

The relative level of potassium decay energy can be determined by integrating energy level counts over multiple channels and making a comparison with the integrated counts. Thus, determining the relative level of potassium decay energy within the selected band of energy levels at block 437 may comprise comparing individual potassium decay energy level counts over a predetermined spectrum channel bandwidth to an integrated energy count over the predetermined spectrum channel bandwidth comprising multiple channels that occupy at least the selected band of energy levels.

At block 441, the method 411 may include adjusting at least one of a detector supply voltage or an analyzer gain to place the potassium decay energy at a selected energy level location when the relative level of potassium decay energy exceeds a predetermined threshold, the threshold based on an energy level of a combination of detected gamma radiation within the selected band of energy levels.

The relative potassium decay energy can be displayed, along with energies associated with combinations of elements. Thus, the method 411 may include, at block 445, displaying the relative level of potassium decay energy along with the combination of at least two of potassium, uranium, or thorium, in a visible format (e.g., in a manner similar or identical to what is shown in FIG. 2).

The bandwidth associated with the selected band of energy levels can be selected to accommodate the expected location that will be selected as an adjustment—the location in the detection spectrum to which the measured level of potassium decay energy will be moved, to be used as a reference in the future. Thus, the selected band of energy levels may include a measured energy level of 1460 keV.

The selected band of energy levels can be selected to include a bandwidth that accommodates drift in the measured potassium energy decay level. Thus, the selected band of energy levels may have an energy level width sufficient to include an expected amount of energy level measurement drift with respect to the potassium decay energy.

The band of energy levels may form part of an evenly divided, channelized structure. Thus, the selected band of energy levels may form a portion of a set of numbered channels that approximately evenly divide a detected energy spectrum into a fixed number of bins.

The operation of a gamma radiation detection system can be stabilized in real-time, by repeatedly applying the actions of detecting, determining the relative potassium decay energy level, and adjusting the detector supply voltage and/or analyzer gain in response. Thus, the method 411 may comprise repeating the detecting (at block 425), the determining (at block 437), and the adjusting (at block 441) on a periodic basis to provide operational stabilization of a gamma radiation detection system.

Simulation results can be used to stabilize the gamma radiation detection system. Thus, placing the potassium decay energy at a selected energy level location may comprise the activity of moving a measured or simulated peak potassium decay energy location associated with one of the bins to another one of the bins associated with the selected energy level location.

Figure 5:
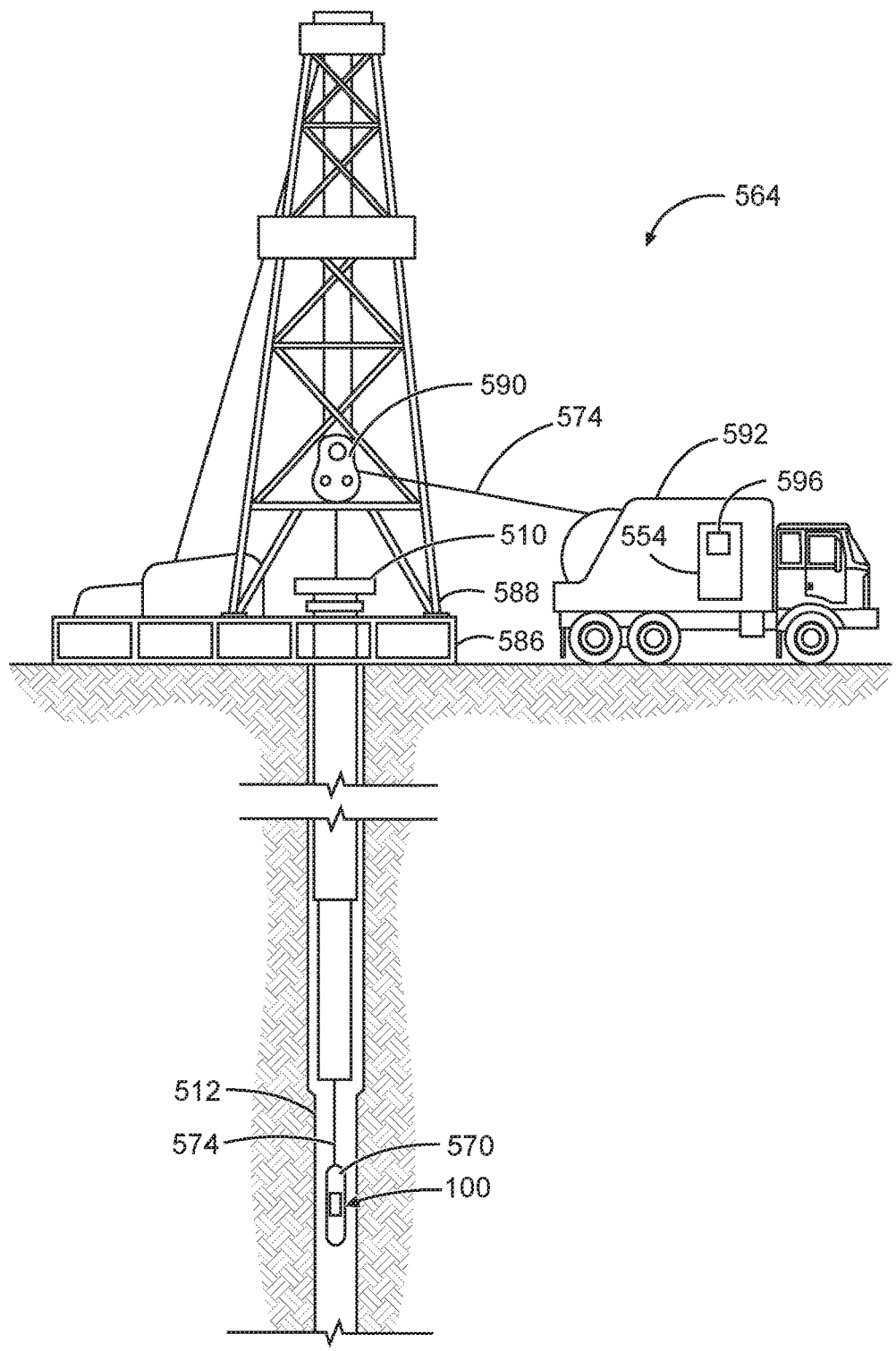
FIG. 5 depicts an example wireline system, according to various embodiments of the invention.
Figure 6:
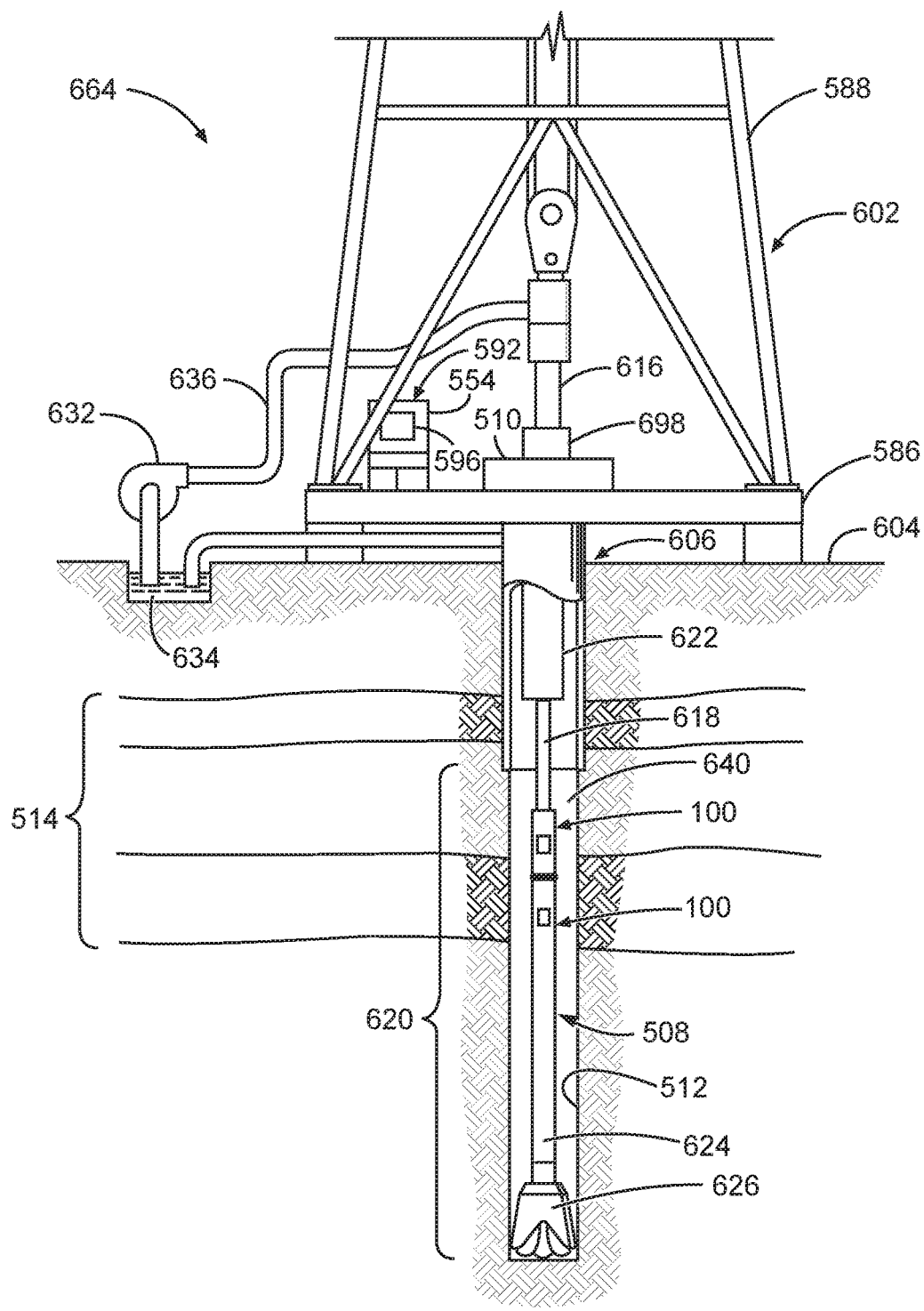
FIG. 6 depicts an example drilling rig system, according to various embodiments of the invention.

As described earlier herein, gamma ray measurement tools can be used in an LWD assembly or a wireline logging tool. FIG. 5 depicts an example wireline system, according to various embodiments of the invention. FIG. 6 depicts an example drilling rig system, according to various embodiments of the invention.

Either of the systems in FIG. 5 and FIG. 6 are operable to control a gamma ray measurement apparatus 100 to conduct measurements in a wellbore. Thus, the systems 564, 664 may comprise portions of a wireline logging tool body 570 as part of a wireline logging operation, or of a downhole tool 624 (e.g., a drilling operations tool) as part of a downhole drilling operation.

Returning now to FIG. 5, a well during wireline logging operations can be seen. In this case, a drilling platform 586 is equipped with a derrick 588 that supports a hoist 590.

Drilling oil and gas wells is commonly carried out using a string of drill pipes connected together so as to form a drilling string that is lowered through a rotary table 510 into a wellbore or borehole 512. Here it is assumed that the drilling string has been temporarily removed from the borehole 512 to allow a wireline logging tool body 570, such as a probe or sonde, to be lowered by wireline or logging cable 574 into the borehole 512. Typically, the wireline logging tool body 570 is lowered to the bottom of the region of interest and subsequently pulled upward at a substantially constant speed.

During the upward trip, at a series of depths the instruments (e.g., the gamma ray measurement apparatus 100 shown in FIG. 1) included in the tool body 570 may be used to perform measurements on the subsurface geological formations adjacent the borehole 512 (and the tool body 570). The measurement data can be communicated to a surface logging facility 592 for storage, processing, and analysis. The logging facility 592 may be provided with electronic equipment for various types of signal processing, which may be implemented by any one or more of the components of the gamma ray measurement apparatus 100. Similar formation evaluation data may be gathered and analyzed during drilling operations (e.g., during LWD operations, and by extension, sampling while drilling).

In some embodiments, the tool body 570 comprises a gamma ray measurement apparatus 100 for obtaining and analyzing gamma ray field measurements in a subterranean formation through a borehole 512. The tool is suspended in the wellbore by a wireline cable 574 that connects the tool to a surface control unit (e.g., comprising a workstation 554, which can also include a display). The tool may be deployed in the borehole 512 on coiled tubing, jointed drill pipe, hard wired drill pipe, or any other suitable deployment technique.

Turning now to FIG. 6, it can be seen how a system 664 may also form a portion of a drilling rig 602 located at the surface 604 of a well 606. The drilling rig 602 may provide support for a drill string 608. The drill string 608 may operate to penetrate the rotary table 510 for drilling the borehole 512 through the subsurface formations 514. The drill string 608 may include a Kelly 616, drill pipe 618, and a bottom hole assembly 620, perhaps located at the lower portion of the drill pipe 618.

The bottom hole assembly 620 may include drill collars 622, a downhole tool 624, and a drill bit 626. The drill bit 626 may operate to create the borehole 512 by penetrating the surface 604 and the subsurface formations 614. The downhole tool 624 may comprise any of a number of different types of tools including MWD tools, LWD tools, and others.

During drilling operations, the drill string 608 (perhaps including the Kelly 616, the drill pipe 618, and the bottom hole assembly 620) may be rotated by the rotary table 510. Although not shown, in addition to, or alternatively, the bottom hole assembly 620 may also be rotated by a motor (e.g., a mud motor) that is located downhole. The drill collars 622 may be used to add weight to the drill bit 626. The drill collars 622 may also operate to stiffen the bottom hole assembly 620, allowing the bottom hole assembly 620 to transfer the added weight to the drill bit 626, and in turn, to assist the drill bit 626 in penetrating the surface 604 and subsurface formations 614.

During drilling operations, a mud pump 632 may pump drilling fluid (sometimes known by those of ordinary skill in the art as "drilling mud") from a mud pit 634 through a hose 636 into the drill pipe 618 and down to the drill bit 626. The drilling fluid can flow out from the drill bit 626 and be returned to the surface 604 through an annular area 640 between the drill pipe 618 and the sides of the borehole 512. The drilling fluid may then be returned to the mud pit 634, where such fluid is filtered. In some embodiments, the drilling fluid can be used to cool the drill bit 626, as well as to provide lubrication for the drill bit 626 during drilling operations. Additionally, the drilling fluid may be used to remove subsurface formation cuttings created by operating the drill bit 626.

Thus, it may be seen that in some embodiments, the systems 564, 664 may include a drill collar 622, a downhole tool 624, and/or a wireline logging tool body 570 to house one or more gamma ray measurement apparatus 100, similar to or identical to the gamma ray measurement apparatus 100 described above and illustrated in FIG. 1, Components of the system 300 in FIG. 3 may also be housed by the tool 624 or the tool body 570.

Thus, for the purposes of this document, the term "housing" may include any one or more of a drill collar 622, a downhole tool 624, or a wireline logging tool body 570 (all having an outer wall, to enclose or attach to magnetometers, sensors, fluid sampling devices, pressure measurement devices, transmitters, receivers, acquisition and processing logic, and data acquisition systems). The tool 624 may comprise a downhole tool, such as an LWD tool or MWD tool. The wireline tool body 570 may comprise a wireline logging tool, including a probe or sonde, for example, coupled to a logging cable 574. Many embodiments may thus be realized.

For example, a system 564, 664 may comprise a downhole tool body, such as a wireline logging tool body 570 or a downhole tool 624 (e.g., an LWD or MWD tool body), and one or more gamma ray measurement apparatus 100 attached to the tool body, the gamma ray measurement apparatus 100 to be constructed and operated as described previously.

In some embodiments, the apparatus 100 may be constructed in the form of a downhole tool. Thus, referring to FIGS. 1 and 5-6, it can be seen that an apparatus 100 may comprise a gamma radiation detector 102 to receive a detector supply voltage, the gamma radiation detector to detect gamma radiation as detected gamma radiation; and a signal processor 104 comprising a pulse height analyzer 116 to determine a relative level of potassium decay energy within a selected band of energy levels with respect to a combination of at least two of potassium, uranium, or thorium, the signal processor 104 comprising a feedback control 106 to adjust at least one of the detector supply voltage or an analyzer gain of the pulse height analyzer to place the potassium decay energy at a selected energy level location when the relative level of potassium decay energy exceeds a predetermined threshold, the threshold based on an energy level of a combination of detected gamma radiation within the selected band of energy levels. The apparatus 100 may further comprise a downhole tool housing 570, 624 to attach to the gamma radiation detector 102.

The apparatus 100 can operate without using a reference radioactive source downhole. Thus, the gamma radiation detector 102, the pulse height analyzer 116, and the feedback control 106, when powered, can operate together to stabilize detection gain of the apparatus 100 downhole without using an on-board radioactive source as a reference gain source.

The downhole tool 570, 624 may include a memory for using in logging gamma ray measurements made by the detector. Thus, the apparatus 100 may further comprise a memory 306 (see FIG. 3) coupled to the gamma radiation detector 102, wherein the memory 306 is used to store a log of the gamma radiation detected by the gamma radiation detector 102.

Any of the above components, for example the gamma ray measurement apparatus 100 (and each of its elements), the systems 300, 564, 664 (and each of their elements) may all be characterized as "modules" herein. Such modules may include hardware circuitry, and/or a processor and/or memory circuits, software program modules and objects, and/or firmware, and combinations thereof, as desired by the architect of the gamma ray measurement apparatus 100 and systems 300, 564, 664 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, a measured radiation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of gamma ray measurement apparatus 100 and systems 300, 564, 664 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Some embodiments include a number of methods.

It should be noted that the methods described herein do not have to be executed in the order described, or in any particular order. Moreover, various activities described with respect to the methods identified herein can be executed in iterative, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

In summary, using the apparatus, systems, and methods disclosed herein may provide increased gain stability with respect to gamma ray measurement tools operating in the presence of sensor sensitivity drift, temperature extremes, vibration, or other environmental or design factors relative to conventional mechanisms. These advantages can significantly enhance the value of the services provided by an operation/exploration company, helping to reduce time-related costs.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Although specific embodiments have been illustrated and described herein, it will be appreciated by those of ordinary skill in the art that any arrangement that is calculated to achieve the some purpose may be substituted for the specific embodiments shown. Various embodiments use permutations or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A method, comprising:
   detecting gamma radiation as detected gamma radiation;
   determining a relative level of potassium decay energy within a selected band of energy levels, with respect to a combination of at least two of potassium, uranium, or thorium; and
   adjusting at least one of a detector supply voltage or an analyzer gain to place the potassium decay energy at a selected energy level location when the relative level of potassium decay energy exceeds a predetermined threshold, the threshold based on an energy level of a combination of detected gamma radiation within the selected band of energy levels.

2. The method of claim 1, further comprising:
   separating the detected gamma radiation according to a preselected number of energy levels.

3. The method of claim 1, further comprising:
   displaying the relative level of potassium decay energy along with the combination of at least two of potassium, uranium, or thorium, in a visible format.

4. The method of claim 1, wherein the selected band of energy levels include a measured energy level of 1460 keV.

5. The method of claim 1, wherein the selected band of energy levels has an energy level width sufficient to include an expected amount of energy level measurement drift with respect to the potassium decay energy.

6. The method of claim 1, further comprising:
   repeating the detecting, the determining, and the adjusting on a periodic basis to provide operational stabilization of a gamma radiation detection system.

7. The method of claim 1, wherein the selected band of energy levels forms a portion of a set of numbered channels that approximately evenly divide a detected energy spectrum into a fixed number of bins.

8. The method of claim 7, wherein placing the potassium decay energy at a selected energy level location comprises:
   moving a measured or simulated peak potassium decay energy location associated with one of the bins to another one of the bins associated with the selected energy level location.

9. The method of claim 1, further comprising:
   measuring actual or simulated energy decay levels of the combination of at least two of potassium, uranium, or thorium, to determine the relative level of potassium decay energy.

10. The method of claim 1, wherein determining the relative level of potassium decay energy within the selected band of energy levels comprises:
    comparing individual potassium decay energy level counts over a predetermined spectrum channel bandwidth to an integrated energy count over the predetermined spectrum channel bandwidth comprising multiple channels that occupy at least the selected band of energy levels.

11. The method of claim 1, further comprising:
    logging the detected gamma radiation as part of a downhole logging operation.

12. An apparatus, comprising:
    a gamma radiation detector to receive a detector supply voltage, the gamma radiation detector to detect gamma radiation as detected gamma radiation;
    a pulse height analyzer coupled to the gamma radiation detector, the pulse height analyzer to determine a relative level of potassium decay energy within a selected band of energy levels, with respect to a combination of at least two of potassium, uranium, or thorium; and
    a feedback control to adjust at least one of the detector supply voltage or an analyzer gain of the pulse height analyzer to place the potassium decay energy at a selected energy level location when the relative level of potassium decay energy exceeds a predetermined threshold, the threshold based on an energy level of a combination of detected gamma radiation within the selected band of energy levels.

13. The apparatus of claim 12, further comprising:
    a high voltage power supply to supply the detector supply voltage.

14. The apparatus of claim 12, wherein the analyzer gain is associated with the pulse height analyzer having an energy analysis spectrum comprising a number of channels into which energy is approximately equally divided.

15. The apparatus of claim 12, wherein the selected band of energy levels correspond to a set of channels on the pulse height analyzer.

16. The apparatus of claim 15, wherein the selected energy level location corresponds to a single channel on the pulse height analyzer, the single channel included in the set of channels.

17. An apparatus, comprising:
- a gamma radiation detector to receive a detector supply voltage, the gamma radiation detector to detect gamma radiation as detected gamma radiation;
- a signal processor comprising a pulse height analyzer to determine a relative level of potassium decay energy within a selected band of energy levels with respect to a combination of at least two of potassium, uranium, or thorium, the signal processor comprising a feedback control to adjust at least one of the detector supply voltage or an analyzer gain of the pulse height analyzer to place the potassium decay energy at a selected energy level location when the relative level of potassium decay energy exceeds a predetermined threshold, the threshold based on an energy level of a combination of detected gamma radiation within the selected band of energy levels; and
- a housing to attach to the gamma radiation detector.

18. The apparatus of claim 17, wherein the gamma radiation detector, the pulse height analyzer, and the feedback control, when powered, can operate together to stabilize detection gain of the apparatus downhole without using an on-board radioactive source as a reference gain source.

19. The apparatus of claim 17, further comprising a memory coupled to the gamma radiation detector, wherein the memory is used to store a log of the gamma radiation detected by the gamma radiation detector.

20. The apparatus of claim 17, wherein the housing comprises one of a wireline tool housing or a downhole tool housing coupled to a drill string.

* * * * *